US012580901B2

(12) United States Patent
Knobloch et al.

(10) Patent No.: US 12,580,901 B2
(45) Date of Patent: Mar. 17, 2026

(54) METHODS AND APPARATUSES FOR SECURE COMMUNICATION BETWEEN A FIRST AND A SECOND COMMUNICATION PARTNER

(71) Applicant: Bayerische Motoren Werke Aktiengesellschaft, Munich (DE)

(72) Inventors: Daniel Knobloch, Cupertino, CA (US); Sven Hofmann, Munich (DE); Thorsten Knott, Tuntenhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 263 days.

(21) Appl. No.: 18/041,943

(22) PCT Filed: Jun. 17, 2021

(86) PCT No.: PCT/EP2021/066503
§ 371 (c)(1),
(2) Date: Feb. 16, 2023

(87) PCT Pub. No.: WO2022/063449
PCT Pub. Date: Mar. 31, 2022

(65) Prior Publication Data
US 2023/0319022 A1 Oct. 5, 2023

(30) Foreign Application Priority Data
Sep. 22, 2020 (EP) ..................................... 20197619

(51) Int. Cl.
*H04L 29/06* (2006.01)
*H04L 9/40* (2022.01)
(52) U.S. Cl.
CPC ............................... *H04L 63/0435* (2013.01)

(58) Field of Classification Search
CPC ............. H04L 63/0435; H04L 2209/80; H04L 2209/84; B60R 16/0315; H04W 12/041
See application file for complete search history.

(56) References Cited

U.S. PATENT DOCUMENTS

| | | | | | |
|---|---|---|---|---|---|
| 5,657,390 A | * | 8/1997 | Elgamal | ................ | H04L 9/0841 |
| | | | | | 713/151 |
| 2003/0046409 A1 | * | 3/2003 | Graham | ................ | H04L 63/126 |
| | | | | | 709/224 |

(Continued)

FOREIGN PATENT DOCUMENTS

| | | | |
|---|---|---|---|
| CN | 109495872 A | | 3/2019 |
| CN | 113535247 A | * | 10/2021 |

(Continued)

OTHER PUBLICATIONS

International Search Report corresponding to International Patent Application No. PCT/EP2021/066503, dated Sep. 17, 2021 (2 pages).

(Continued)

*Primary Examiner* — Shawnchoy Rahman
(74) *Attorney, Agent, or Firm* — Maginot, Moore & Beck LLP

(57) ABSTRACT

Methods and apparatuses for secure communication between a first and a second communication partner are provided. The method for secure communication between a first and a second communication partner comprises establishing a communication link between the first and the second communication partner. Further, the method comprises determining one or more session identifiers by one of the first and the second communication partner. The method additionally comprises communicating the one or more session identifiers to the other of the first and the second communication partner. The method comprises determining, for each of the one or more session identifiers, a respective (Continued)

200 establishing a communication link between the first and the second communication partner — 201 determining one or more random session identifierts by one of the first and the second communication partner — 202 communicating the one one or more random session identifiers to the other of the first and the second communciation — 203 determining, for each of the one or more random session identifiers, a respective symmetric session key in each of the first and the second communication partner — 204 storing the one or more random session identifiers and the corresponding symmetric session keys in each of the first and the second communication partner for one or more subsequent secure communication sessions — 205 symmetric session key in each of the first and the second communication partner. In addition, the method comprises storing the one or more session identifiers and the corresponding symmetric session keys in each of the first and the second communication partner for one or more subsequent secure communication sessions.

19 Claims, 5 Drawing Sheets

(56) References Cited

U.S. PATENT DOCUMENTS

| | | | |
|---|---|---|---|
| 2003/0110382 A1* | 6/2003 | Leporini | G06F 21/10 |
| | | | 713/172 |
| 2003/0135465 A1* | 7/2003 | Lee | G06F 21/10 |
| | | | 705/51 |
| 2011/0261961 A1 | 10/2011 | Dharmaraju et al. | |
| 2015/0052352 A1* | 2/2015 | Dolev | H04L 9/3278 |
| | | | 713/156 |
| 2018/0198766 A1* | 7/2018 | Moon | H04L 9/14 |

| | | | | |
|---|---|---|---|---|
| 2019/0001925 A1 | 1/2019 | Arakawa et al. | | |
| 2021/0201249 A1* | 7/2021 | Crone | | G06Q 10/047 |
| 2021/0409210 A1* | 12/2021 | Krummel | | H04L 9/3247 |

FOREIGN PATENT DOCUMENTS

| | | | | |
|---|---|---|---|---|
| EP | 2320621 A1 | 5/2011 | | |
| GB | 2561583 A | * 10/2018 | | B60R 25/00 |
| WO | WO-2009013673 A2 | * 1/2009 | | G06F 21/53 |

OTHER PUBLICATIONS

Written Opinion corresponding to International Patent Application No. PCT/EP2021/066503, dated Sep. 17, 2021 (5 pages).

Extended European Search Report corresponding to European Patent Application No. EP20197619.8, dated Mar. 1, 2021 (7 pages).

Chinese Office Action corresponding to Chinese Patent Application No. 202180055924.X, dated Dec. 5, 2025. (6 pages).

English Translation of Chinese Office Action corresponding to Chinese Patent Application No. 202180055924.X, dated Dec. 5, 2025. (9 pages).

* cited by examiner

METHODS AND APPARATUSES FOR SECURE COMMUNICATION BETWEEN A FIRST AND A SECOND COMMUNICATION PARTNER

CROSS-REFERENCE TO RELATED APPLICATIONS

The present application is the U.S. national phase of PCT Application PCT/EP2021/066503 filed on Jun. 17, 2021, which claims priority of European patent application No. 20197619.8 filed on Sep. 22, 2020, which is incorporated herein by reference in its entirety.

FIELD

The present disclosure generally relates to methods and apparatuses for secure communication between a first and a second communication partner and, more particularly, to secure communication for lock and unlock procedures.

BACKGROUND

To secure communication between, for example, a car and a smartphone of a user, symmetric session keys and corresponding session identifiers may be used as symmetrical encryption method for lock and unlock procedures. The conventional lock and unlock procedures using symmetric session keys may take several seconds due to the dilatory derivation of the symmetric session keys with conventional methods. A duration of several seconds for locking and unlocking in this application may lead to appreciable delaying for the user, which may be disturbing and may reduce the ease of use especially in situations when the user is in a hurry or carries high weight.

Thus, there is a need to speed up lock and unlock procedures using symmetric session keys as symmetrical encryption method.

This need is addressed by the subject matter of the independent claims.

SUMMARY

According to a first aspect, the present disclosure provides a method for secure communication between a first and a second communication partner. The method comprises establishing a communication link between the first and the second communication partner. The method also comprises determining one or more session identifiers by one of the first and the second communication partner for one or more subsequent secure communication sessions. The method further comprises communicating the one or more session identifiers to the other of the first and the second communication partner. The method further comprises determining, for each of the one or more session identifiers, a respective symmetric session key in each of the first and the second communication partner. The method further comprises storing the one or more session identifiers and the corresponding symmetric session keys in each of the first and the second communication partner for one or more subsequent secure communication sessions.

According to a second aspect, the present disclosure provides an apparatus for secure communication. The apparatus comprises means for establishing a communication link to another communication partner. The apparatus also comprises means for determining one or more session identifiers. The apparatus further comprises means for communicating the one or more session identifiers to the communication partner. The apparatus further comprises means for determining, for each of the one or more session identifiers, a respective symmetric session key. The apparatus further comprises means for storing the one or more session identifiers and the corresponding symmetric session keys for one or more subsequent secure communication sessions.

Embodiments of the present disclosure are based on the finding that the symmetric session keys are determined and stored with the corresponding session identifiers in each of a first and a second communication partner during a previous communication session for one or more subsequent secure communication sessions. This may lead to faster establishing the secure communication between the first and the second communication partner with the stored symmetric session key in the one or more subsequent secure communication sessions.

In some embodiments, the method may further comprise in the one or more subsequent secure communication sessions: selecting one of the stored session identifiers by one of the first and the second communication partner, communicating the selected session identifier to the other of the first and the second communication partner, using the corresponding stored symmetric session key for the one or more subsequent secure communication sessions to secure communication between the first communication partner and the second communication partner. This may enable a faster establishing of the secure communication with the stored symmetric session key and the corresponding session identifier in the one or more subsequent secure communication sessions between the first and the second communication partner.

In some embodiments, the method may further comprise in the one or more subsequent secure communication sessions: setting up a ranging procedure between the first communication partner and the second communication partner in the one or more subsequent secure communication sessions after using the stored symmetric session key to securely communicate between the first communication partner and the second communication partner. This may enable to provide a secure determination of the distance between the first and the second communication partner and to provide a function in dependence of the distance between the first and the second communication partner.

If a distance between the first and the second communication partner falls below a threshold value, an unlocking procedure may be performed by one of the first and the second communication partner. If the distance between the first and the second communication partner exceeds the threshold value, a locking procedure may be performed by one of the first and the second communication partner. In this case a user-friendly locking and unlocking procedure may be provided, which may allow a distance dependent locking and unlocking procedure. This procedure may be fast, convenient to the user and may not need a user action to start the locking and unlocking procedure.

In some embodiments, the ranging procedure may comprise determining a distance between the first and the second communication partner by measuring the time difference between a first time t1 of sending a ranging signal from one of the first and the second communication partner to the other of the first and the second communication partner and a second time t2 of receiving a response signal from the other of the first and the second communication partner. This may enable a Time-of-Flight (ToF) measurement to reliably determine the distance between the first and the second communication partner.

In at least some embodiments a (radio) beacon signal may be used as the ranging signal. The beacon signal as part of a standardized discovery method may enable a reliable wireless signal transmission.

In some embodiments, the selected session identifier may be communicated via Bluetooth Low Energy (BLE) or Ultra Wide-Band (UWB) to the other of the first and the second communication partner. This may enable an accurate, reliable and energy saving way of transmission of the selected session identifier.

In at least some embodiments the stored symmetric session key may be used to secure communication via BLE or UWB between the first communication partner and the second communication partner. This may enable an accurate, reliable and energy saving way to secure communication with the stored symmetric session key. For example, one of the first and the second communication partner may be a car. The locking and unlocking procedure of cars may be a convenient procedure for the user, which enhance the ease of use especially in situation, when the user is in a hurry or carries high weight.

According to embodiments of the present disclosure one of the first and the second communication partner may be a portable user device. This may provide an easy and convenient way for digital car access for example Smart Access 2.0 to lock and unlock a car with a portable user device such as a smartphone or a smart wristband, for example.

In at least some embodiments, a Diffie-Hellmann based exchange may be used to determine the symmetric session key. A Diffie-Hellman based exchange is a cryptographic method using a public communication link and is used to securely determine symmetric session keys. In this case, a reliable cryptographic key derivation function may be used for the determination of the symmetric session keys. By using a Diffie-Hellmann based exchange, the symmetric session keys may be securely exchanged over a public channel.

In some embodiments, the apparatus may comprise means for selecting one of the stored session identifiers. The apparatus may further comprise means for communicate the selected session identifier to the communication partner. The apparatus may further comprise means for using the corresponding stored symmetric session key for the one or more subsequent secure communication sessions to secure communication with the communication partner. This may enable a faster establishing of the secure communication with the stored symmetric session key and the corresponding session identifier in the one or more subsequent secure communication sessions between the first and the second communication partner.

BRIEF DESCRIPTION OF THE DRAWINGS

Some examples of methods and/or apparatuses will be described in the following by way of example only, and with reference to the accompanying figures, in which.

DESCRIPTION

Figure 1:
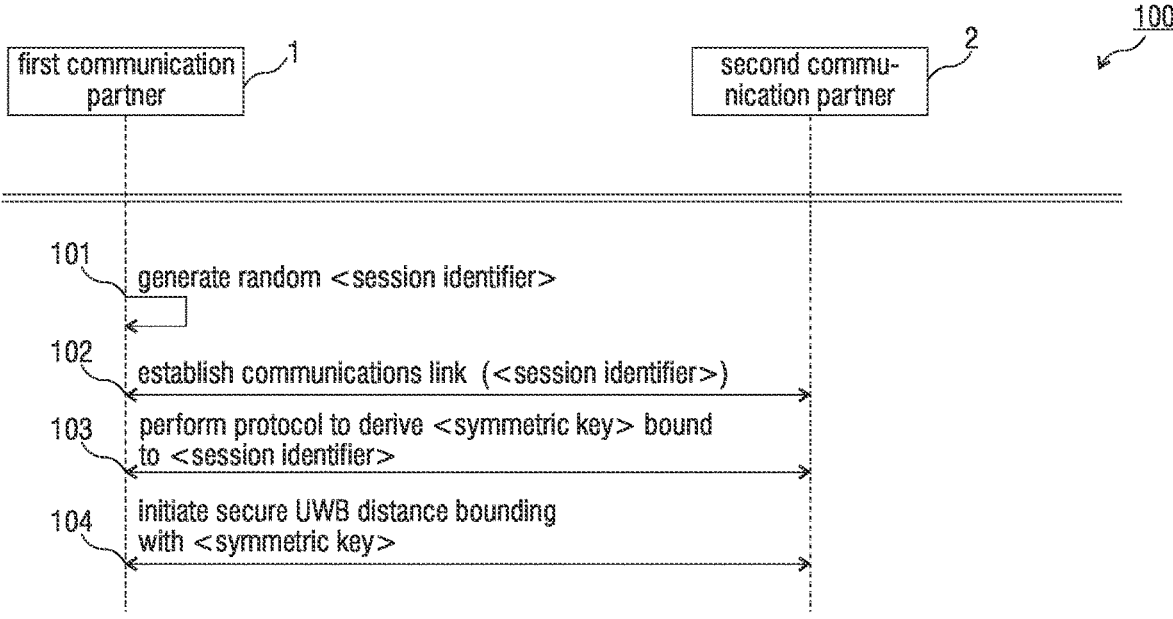
FIG. 1 shows a flow chart of a conventional method for secure communication between a first and a second communication partner.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

FIG. 1 shows a flow chart of a conventional method 100 for secure communication between a first and a second communication partner. The method 100 comprises generating 101 a session identifier by one of the first or the second communication partner. The session identifier may be for example a random session identifier. The method 100 further comprises establishing a communication link between the first and the second communication partner and communicating 102 the session identifiers to the other of the first and the second communication partner. The method 100 further comprises determining 103, for the session identifier, a respective symmetric session key by performing a protocol in each of the first and the second communication partner. The method 100 further comprises initiating 104 a ranging procedure between the first communication partner and the second communication partner using the symmetric session key to securely communicate via Ultra Wide-Band between the first communication partner and the second communication partner.

In the conventional method 100, the symmetric session key and the session identifier are determined and used in each secure communication session to secure communication between the first communication partner and the second communication partner. This conventional method 100 may take several seconds due to the dilatory derivation of the symmetric session keys during each secure communication session. The symmetric session keys may also called symmetric shared secrets.

Figure 2:
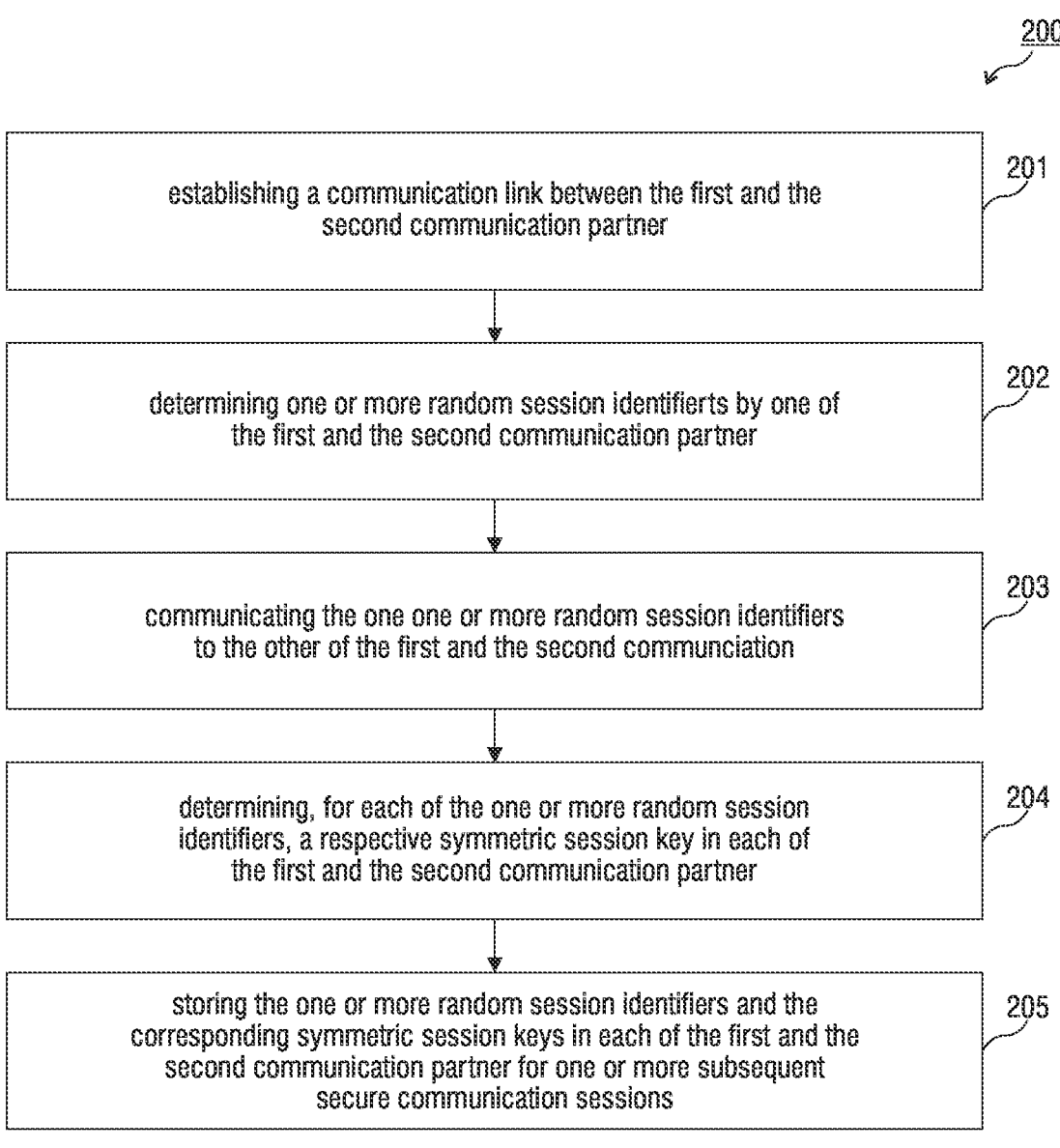
FIG. 2 shows a flow chart of a method for secure communication between a first and a second communication partner according to a first embodiment of the present disclosure.

FIG. 2 shows a flow chart of a method 200 for secure communication between a first and a second communication partner according to a first embodiment of the present disclosure. The method 200 comprises establishing 201 a communication link between the first and the second communication partner. The method 200 further comprises determining 202 one or more session identifiers by one of the first and the second communication partner. The session identifier may, e.g., be determined randomly or by sequential numbering and be used to identify a secure session communication unambiguously. Also a set of session identifiers may be determined for a set of subsequent secure communication sessions. The method 200 further comprises communicating 203 the one or more session identifiers to the other of the first and the second communication partner. The selected session identifier may, e.g., be communicated via BLE or UWB to the other of the first and the second communication partner. However, also other communication techniques may be used. The method further comprises determining 204, for each of the one or more session identifiers, a respective symmetric session key in each of the first and the second communication partner. The symmetric session key may be a single-use symmetric key used for encryption and decryption. The symmetric key may be determined using a key derivation function. For example, the symmetric session key may be determined with a Diffie-Hellmann based exchange. An authentication protocol may be used, which verifies the first and second communication partner and on success a symmetric session key is derived. The method 200 further comprises storing 205 the one or more session identifiers and the corresponding symmetric session keys in each of the first and the second communication partner for one or more subsequent (future, new) secure communication sessions. This pre-derivation of symmetric session keys for future sessions differs from the conventional method 100. This step can be done at any point in time during a running session after a connection has been set up. Usually this is done after the performance critical operations have been performed. Thereby, the performance critical steps have been moved from the start of the session to any point in time during an earlier session. This assures minimum latency for the availability of the secure session between a first and a second system application after establishment of the connection between the first and the second communication partner. A secure communication session is a temporary and secured information exchange session by exchanging public/private key pairs between the first and the second communication partner.

The method 200 according to the first embodiment of the present disclosure differs from the conventional method 100 in that the one or more session identifiers and the corresponding symmetric session keys are determined and stored in each of the first and the second communication partner during a communication session for one or more subsequent secure communication sessions. By using the stored symmetric session key, secure communication between the first and the second communication partner may be established faster in the one or more subsequent secure communication sessions.

Figure 3:
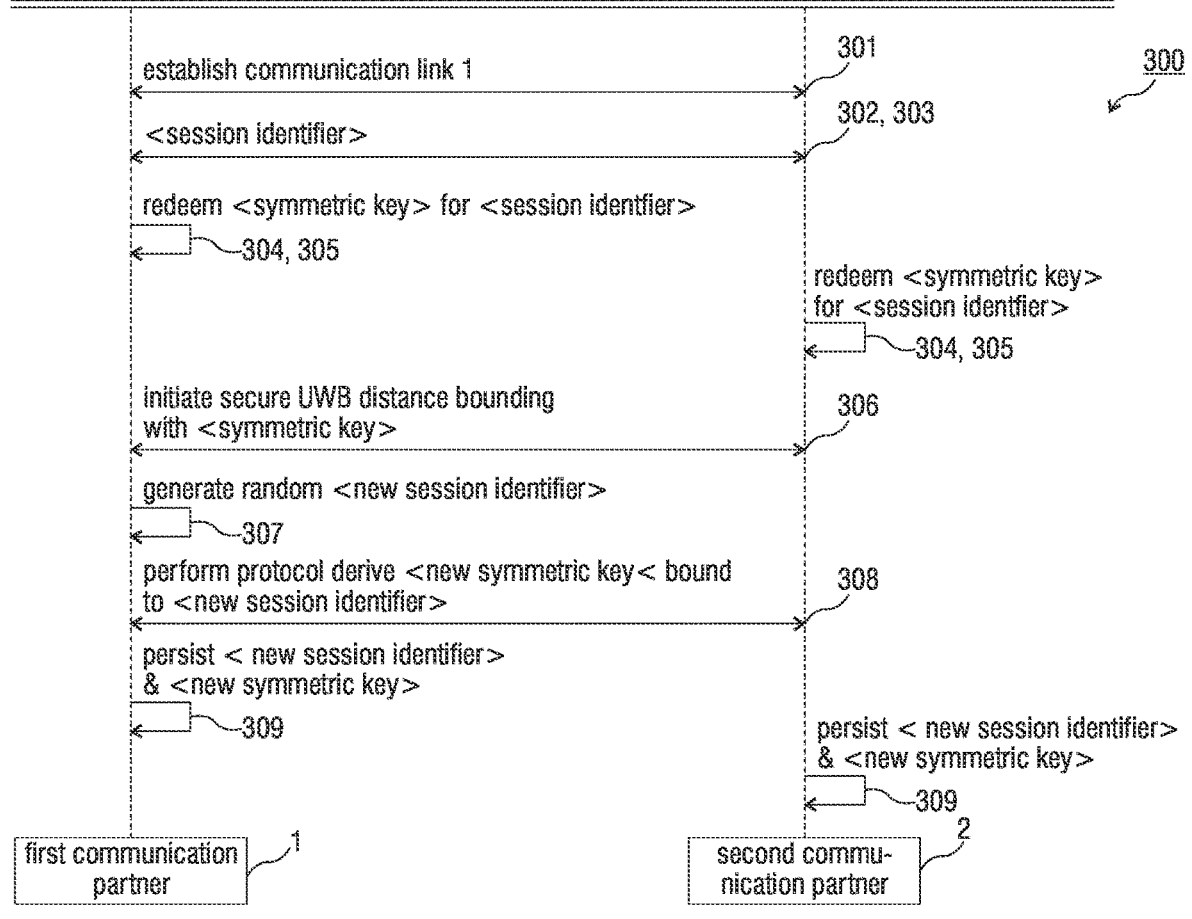
FIG. 3 shows a flow chart of a method for secure communication between a first and a second communication partner according to a second embodiment of the present disclosure.

FIG. 3 shows a method 300 for secure communication between a first communication partner 1 and a second communication partner 2 according to a second embodiment of the present disclosure. The method 300 according to the second embodiment of the present disclosure comprises the following steps, which are equal to the steps of the method 200 according to the first embodiment of the present disclosure. The method 300 comprises establishing 301 a communication link between the first and the second communication partner. The method 300 further comprises determining 302 one or more session identifiers by one of the first and the second communication partner. The method further comprises communicating 303 the one or more session identifiers to the other of the first and the second communication partner. In the example of FIG. 3, the first communication partner 1 communicates 303 the selected session identifier to the second communication partner 2. The method further comprises redeeming 304, 305 the session identifier and a corresponding symmetric session key stored in a previous secure communication session. The method 300 further comprises initiating 306 UWB distance bounding using the stored one or more symmetric session key, additionally the corresponding session identifier may be used. Distance bonding proves that the first and second communication partner are in proximity. Alternatively, the method 300 may further comprise initiating 306 via BLE or similar means. The method 300 further comprises generating a session identifier by selecting 307 one of the stored session identifiers by one of the first and the second communication partner. In the example of FIG. 3, the first communication partner 1 generates 307 one of the session identifiers. The method 300 further comprises communicating the selected session identifier to the other of the first 1 and the second communication partner 2. The method 300 further comprises determining 308, for each of the one or more session identifiers, a respective symmetric session key in each of the first and the second communication partner. The first communication partner 1 and the second communication partner 2 perform a protocol to derive the stored symmetric session key bound to the session identifier. The method further comprises storing 309 the one or more session identifiers and the corresponding symmetric session keys in each of the first and the second communication partner for one or more subsequent secure communication sessions for example by persisting on the session identifier and the corresponding stored symmetric session key. The corresponding stored symmetric session key is used in the first and the second communication partner for the one or more subsequent secure communication sessions to secure communication between the first communication partner and the second communication partner.

The method 300 according to the second embodiment of the present disclosure further comprises the following steps performed in one or more subsequent secure communication session. The method may further comprise in the one or more subsequent secure communication session selecting one of the stored session identifiers by one of the first 1 and the second communication partner 2. The session identifier may be selected randomly for example. The method may further comprise communicating the selected session identifier to the other of the first 1 and the second communication partner 2. For example, the first communication partner 1 may communicate the selected session identifier to the second communication partner 2. The method may further comprise using the corresponding stored symmetric session key for the one or more sub-sequent secure communication sessions to secure communication between the first communication partner 1 and the second communication partner 2. The stored symmetric session key may be used to secure communication via BLE (for example according to the standard IEEE 802.15.4z of the Institute of Electrical and Electronics Engineers, IEEE), or UWB between the first communication partner 1 and the second communication partner 2. UWB is a radio technology that uses extremely large frequency ranges with a bandwidth of at least 500 MHz or of at least 20% of the arithmetic mean of the lower and upper cut-off frequency of the used frequency band.

Figure 4:
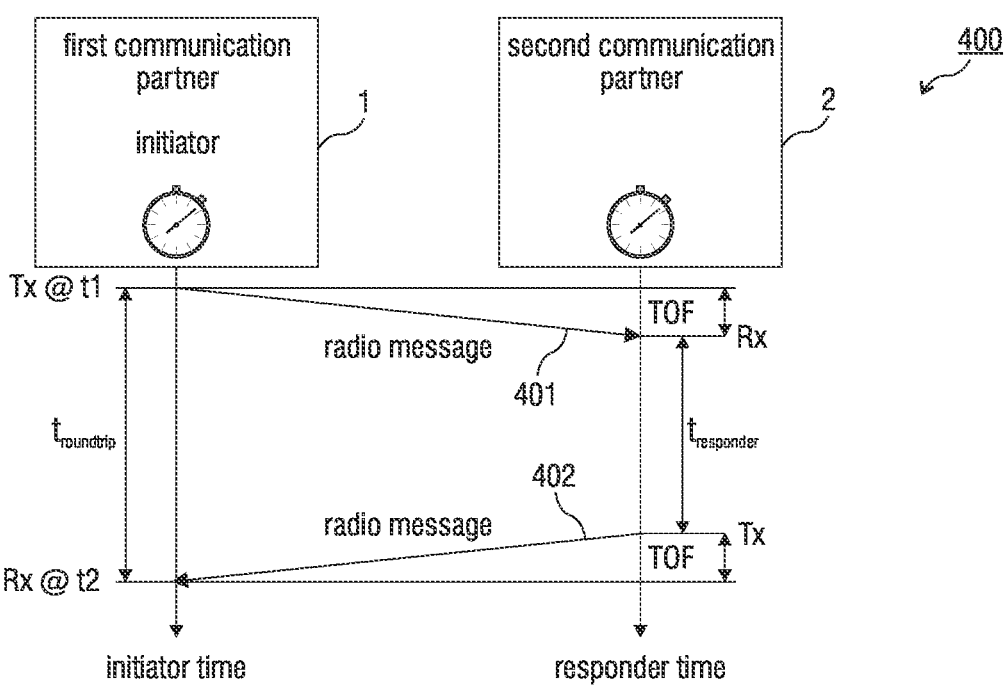
FIG. 4 shows a flow chart of a method for determining a distance between the first and the second communication partner in a ranging procedure according to the present disclosure.

The method may further comprise setting up a ranging procedure, as shown in FIG. 4, for determining a distance between the first communication partner 1 and the second communication partner 2 in the one or more subsequent secure communication sessions after using the stored symmetric session key to securely communicate between the first communication partner 1 and the second communication partner 2. The ranging may be only successful, if the same symmetric session key is used from the first and second communication partner.

The method may be applied to a locking procedure and/or a unlocking procedure by one of the first communication partner 1 and the second communication partner 2. The method may further comprise performing the unlocking procedure by one of the first communication partner 1 and the second communication partner 2, if a distance between the first communication partner 1 and the second communication partner 2 falls below a threshold value. The method may further comprise performing the locking procedure by one of the first communication partner 1 and the second communication partner 2, if the distance between the first communication partner 1 and the second communication partner 2 exceeds the threshold value. The threshold value may be in the range of 1.5 m and 2.5 m, especially 2 m.

The first communication partner 1 may be a vehicle, a movable element for closing an opening, or a locking element. The vehicle may, e.g., be a car, a bicycle, a truck or a motorbike. The vehicle may comprise the movable element for closing the opening and/or the locking element. The movable element for closing the opening may be a door, especially a front door of a housing or a vehicle door. The movable element for closing the opening may comprise the locking element. The locking element may, e.g., be a lock of the vehicle or the movable element for closing the opening. The locking element may be constructed to allow or to deny access to an object (e.g. a vehicle) or a special area.

The second communication partner 2 may be a portable user device such as a smartphone, a tablet, a smart wristband or similar means.

FIG. 4 shows a flow chart of an exemplary method 400 for determining a distance between the first communication partner 1 and the second communication partner 2 in a ranging procedure using a ToF measurement according to the present disclosure. The basic concept of the ToF measurement may be to calculate the distance between the first communication partner 1 and the second communication partner 2 by determining the ToF of a ranging signal and a response signal travelling between the first communication partner 1 and the second communication partner 2. The ranging procedure may comprise two way ranging using the ranging signal 401 from one of the first communication partner 1 and the second communication partner 2 to the other of the first communication partner 1 and the second communication partner 2 and the response signal 402 from the other of the first communication partner 1 and the second communication partner 2 to the one of the first communication partner 1 and the second communication partner 2. The distance D may be determined by measuring the time difference between a first time t1 of sending the ranging signal 401 from one of the first communication partner 1 and the second communication partner 2 to the other of the first communication partner 1 and the second communication partner 2 and a second time t2 of receiving the response signal 402 from the other of the first communication partner 1 and the second communication partner 2. Both the first time t1 and the second time t2 are measured with a clock associated to the one of the first communication partner 1 and the second communication partner 2 sending the ranging signal 401. The TOF may be determined according to the following equation:

$$TOF = \frac{t2 - t1 - t_{response}}{2}$$

with $t_{response}$ denoting the response time for sending the response signal 402 from the other of the first communication partner 1 and the second communication partner 2 after receipt of the ranging signal 401.

With the assumption that the speed of the ranging signal 401 and the response signal 402 through air is equal to the speed of light c, the distance D between the first communication partner 1 and the second communication partner 2 may be calculated according to the following equation:

$$D = c \times ToF = c \times \frac{t2 - t1 - t_{response}}{2}$$

A beacon signal may be used as the ranging signal 401 and/or as the response signal 402. The beacon signal may be a wireless signal and one of a radio, an ultrasonic, an optical, a laser or other type of signal.

Figure 5:
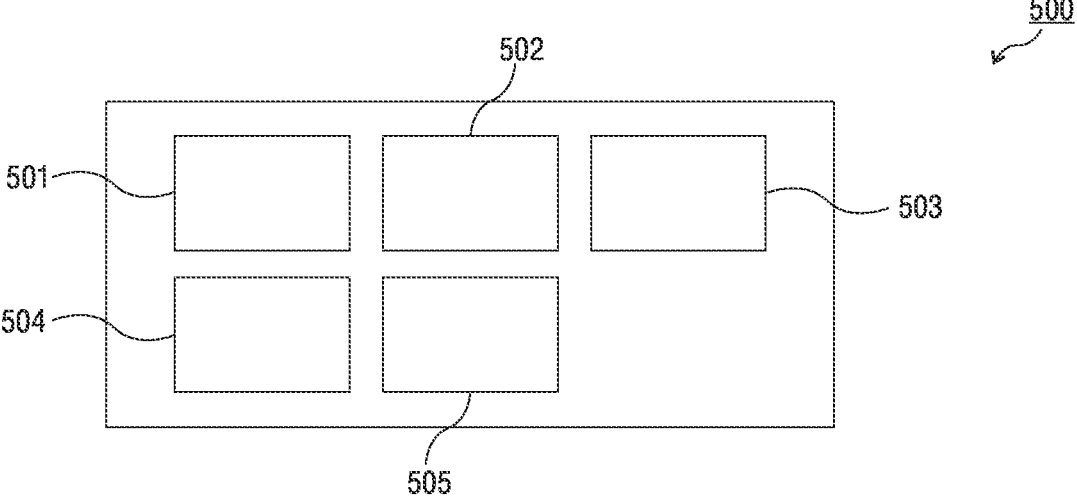
FIG. 5 shows a block diagram of a first apparatus of a first communication partner according to a first embodiment of the present disclosure.

FIG. 5 shows a block diagram of a first apparatus 500 of a first communication partner according to a first embodiment of the present disclosure. The first apparatus 500 for a secure communication comprises means (circuitry) 501 for establishing a communication link to another communication partner. Examples for means 501 for establishing a communication link to another communication partner may be an interface such as a BLE interface, an UWB interface or similar means.

The first apparatus 500 further comprises means (circuitry) 502 for determining one or more session identifiers. Means 502 for determining one or more session identifiers may be for example a first system application running on a processing circuit of the first apparatus 500, or similar means. The first system application may be able to store, access data and execute applications. The first system application may comprise an interface, a programming logic and a database. The interface may be configured to exchange data electronically with other applications. The programming logic may comprise one or more computer programs, scripts or other type of computer instructions. The database may be a repository of data that may be used to store data in a structured format.

The first apparatus 500 further comprises means (circuitry) 503 for communicating the one or more session identifiers to the communication partner. Examples for means 503 for communicating the one or more session identifiers to the communication partner may be an interface for BLE, an interface for UWB or an interface for another communication technique.

The first apparatus 500 further comprises means (circuitry) 504 for determining, for each of the one or more session identifiers, a respective symmetric session key. The means 504 for determining, for each of the one or more session identifiers, a respective symmetric session key may be for example a first secure environment application running on the processing circuit or similar means. The first secure environment application may comprise an interface, a programming logic and a database.

The first apparatus 500 further comprises means (circuitry) 505 for storing the one or more session identifiers and the corresponding symmetric session keys for one or more subsequent secure communication sessions. Examples for means 505 for storing the one or more session identifiers and the corresponding symmetric session keys for one or more subsequent secure communication sessions may be a non-volatile storage such as flash memory, hard disk drive, ferroelectric random-access memory or similar means. The one or more session identifiers and the corresponding symmetric session keys for one or more subsequent secure communication sessions may be stored inside the first secure environment application, which may be used to protect data, in the non-volatile storage.

Furthermore, the first apparatus 500 may comprise means for selecting one of the stored session identifiers. The first apparatus 500 may comprise further means for communicating the selected session identifier to the communication partner. The first apparatus 500 may comprise further means for using the corresponding stored symmetric session key for the one or more subsequent secure communication sessions to secure communication with the communication partner. Further details of the various means of the first apparatus 500 are described above with respect to the proposed method for secure communication.

A second apparatus of a second communication partner may be configured and constructed analogously to the first apparatus 500.

Figure 6:
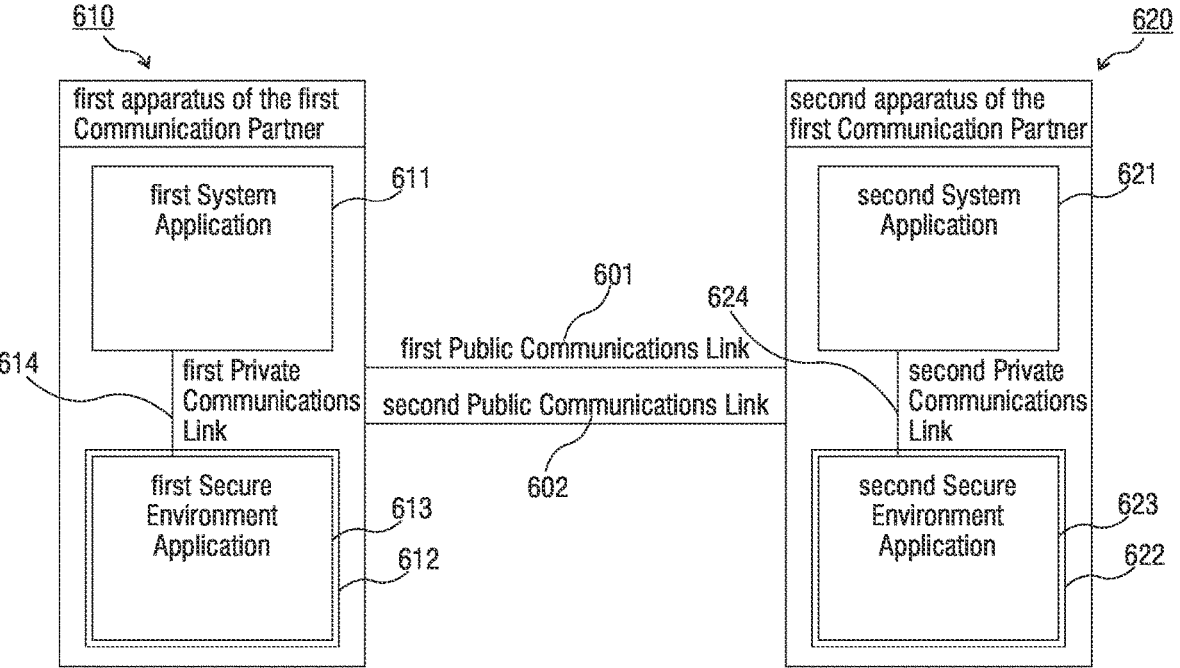
FIG. 6 shows a block diagram of a first apparatus of a first communication partner and a second apparatus of a second communication partner according to a second embodiment of the present disclosure.

FIG. 6 shows a block diagram of a first apparatus 610 of a first communication partner and a second apparatus 620 of a second communication partner according to a second embodiment of the present disclosure. The first apparatus 610 comprises a first system application 611. The first system application 611 may comprise an interface, a programming logic and a database. The first system application 611 may be configured to select one of the stored session identifiers and store the session identifiers. The first system application 611 may be used to retrieve the corresponding stored symmetric session key for the one or more subsequent secure communication sessions to secure communication with the communication partner using the stored session identifier.

The first apparatus 610 comprises further a first secure element 612 for example a processing circuit. The first secure element 612 comprises a first secure environment application 613. The first secure element 612 may be able to securely store, access data and execute applications. The first secure element 612 may be for example a secure environment. The first secure environment application 613 may comprise an interface, a programming logic and a database. The first secure environment application 613 may be used to establish a communication link to the second communication partner. Furthermore, the first secure environment application 613 may be used to derive the corresponding stored symmetric session key using a key derivation function. The symmetric session keys are derived using a symmetric information from the initialization of the trust relationship and a random, session specific information, bound to the corresponding session identifiers, which is shared via a first public communication link 601 as a secure communications link. The first secure environment application 613 may store the session identifier and the corresponding stored symmetric session key for the one or more subsequent secure communication sessions to secure communication with the communication partner. These symmetric session keys are also called pre-derived session keys. The pre-derived session keys may be derived from static and random information shared between the first and a second secure environment application on demand. The pre-derived session keys may be used to secure communication between system level applications between the first and the second communication partner.

The first apparatus 610 comprises further a first private communication link 614, which connects the first system application 611 and the first secure environment application 613. The first private communication link 614 may be a wireless communication link. The first private communication link 614 may be used to retrieve the symmetric session key using the stored session identifier by the first system application 611 from the first secure environment application 613.

The second apparatus 620 for a secure communication may be constructed just like the first apparatus 610, described above. The second apparatus 620 comprises a second system application 621 and a second secure element 622. The second secure element 622 comprises the second secure environment application 623. The second apparatus 620 further comprises a second private communication link 624, which connects the second system application 621 and the second secure environment application 623.

Hereby, the second system application 611 may be configured just like the first system application 621. Further the second secure element 622 may be constructed just like the first secure element 612. The second secure environment application 623 may be configured just like the first secure environment application 613. The second private communication link 624 may be constructed just like the first private communication link 614.

The selected session identifier may be communicated to the communication partner via the first public communication link 601 between the first apparatus 610 and the second apparatus 620.

Furthermore, the corresponding stored symmetric session key for the one or more subsequent secure communication sessions may be used to secure communication between the first apparatus 610 and the second apparatus 620 via the first public communication link 601. The first system application 611 and the second system application 621 may be used to secure communication via the first public communication link 601.

Alternatively, the corresponding stored symmetric session key may be used to secure communication via a second public communication link 602 between the first apparatus 610 and the second apparatus 620. The first system application 611 and the second system application 621 may be used to secure communication via the second public communication link 602. The second public communication link 602 may be a different wireless communication link than the first public communication link 601. The first public communication link 601 and the second public communication link 602 may use different technologies such as UWB and BLE. Alternatively, the same technology may be used for the first public communication link 601 and the second public communication link 602, but the first 601 and the second public communication link 602 may differ in at least one other quantity (for example, a used frequency band).

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A method for secure communication between a first and a second communication partner, comprising:
establishing a communication link between the first and the second communication partner;
determining one or more session identifiers by one of the first and the second communication partner for one or more subsequent new secure communication sessions wherein the one or more session identifiers are different from a session identifier of the communication link;
communicating the one or more session identifiers to another of the first and the second communication partner using the communication link;
determining, for each of the one or more session identifiers, a respective session-specific corresponding symmetric session key bound to the corresponding session identifiers in each of the first and the second communication partner; and
storing the one or more session identifiers and the corresponding session-specific symmetric session keys in each of the first and the second communication partner for one or more subsequent new secure communication sessions.

2. The method according to claim 1, further comprising in the one or more subsequent secure communication sessions:
selecting one of the stored session identifiers by one of the first and the second communication partner;
communicating the selected session identifier to the other of the first and the second communication partner; and
using the stored corresponding symmetric session key for the one or more subsequent secure communication sessions to secure communication between the first communication partner and the second communication partner.

3. The method according to claim 2, further comprising in the one or more subsequent secure communication sessions:
setting up a ranging procedure between the first communication partner and the second communication partner in the one or more subsequent secure communication sessions after using the stored corresponding symmetric session key to securely communicate between the first communication partner and the second communication partner.

4. The method according to claim 3, wherein, when a distance between the first and the second communication partner falls below a threshold value, performing an unlocking procedure by one of the first and the second communication partner, and wherein, when the distance between the first and the second communication partner exceeds the threshold value, performing a locking procedure by one of the first and the second communication partner.

5. The method according to claim 4, wherein the ranging procedure comprises determining the distance between the first and the second communication partner by measuring a time difference between a first time of sending a ranging signal from one of the first and the second communication partner to an other of the first and the second communication partner and a second time of receiving a response signal from the other of the first and the second communication partner.

6. The method according to claim 5, wherein a beacon signal is used as the ranging signal.

7. A method for secure communication between a first and a second communication partner, comprising:
establishing a communication link between the first and the second communication partner;

determining one or more session identifiers by one of the first and the second communication partner for one or more subsequent secure communication sessions;

communicating the one or more session identifiers to an other of the first and the second communication partner;

determining, for each of the one or more session identifiers, a respective corresponding symmetric session key in each of the first and the second communication partner; and storing the one or more session identifiers and the corresponding symmetric session keys in each of the first and the second communication partner for one or more subsequent secure communication sessions;

in the one or more subsequent secure communication sessions, selecting one of the stored session identifiers by one of the first and the second communication partner, communicating the selected session identifier to the other of the first and the second communication partner, and using the stored corresponding symmetric session key for the one or more subsequent secure communication sessions to secure communication between the first communication partner and the second communication partner, setting up a ranging procedure between the first communication partner and the second communication partner in the one or more subsequent secure communication sessions after using the stored corresponding symmetric session key to securely communicate between the first communication partner and the second communication partner, wherein the ranging procedure comprises determining a distance between the first and the second communication partner by measuring a time difference between a first time of sending a ranging signal from one of the first and the second communication partner to an other of the first and the second communication partner and a second time of receiving a response signal from the other of the first and the second communication partner.

8. The method according to claim 1, wherein the selected session identifier is communicated via Bluetooth Low Energy or Ultra Wide-Band to the other of the first and the second communication partner.

9. The method according to claim 8, wherein the stored corresponding symmetric session key is used to secure communication via Bluetooth Low Energy or Ultra Wide-Band between the first communication partner and the second communication partner.

10. The method according to claim 1, wherein one of the first and the second communication partner is a vehicle.

11. The method according to claim 1, wherein one of the first and the second communication partner is a portable user device.

12. The method according to claim 1 wherein the first communication partner is a vehicle and the second communication partner is a smartphone.

13. The method according to claim 1, wherein a Diffie-Hellmann based exchange is used to determine the corresponding symmetric session key.

14. An apparatus for secure communication, comprising:

means for establishing a communication link between one communication partner and another communication partner;

means for determining one or more session identifiers wherein the one or more session identifiers are different from a session identifier of the communication link;

means for communicating the one or more session identifiers to the one communication partner using the communication link;

means for determining, for each of the one or more session identifiers, a respective corresponding session-specific symmetric session key bound to the corresponding session identifiers; and means for storing the one or more session identifiers and the corresponding session-specific symmetric session keys for one or more subsequent new secure communication sessions.

15. The apparatus according to claim 14, further comprising:

means for selecting one of the session identifiers stored in the means for storing one or more session identifiers; and means for communicating a selected one of the session identifiers to the communication partner; and means for using a corresponding symmetric session key stored in the means for storing for the one or more subsequent secure communication sessions to secure communication between the one communication partner and the another communication partner.

16. The apparatus of claim 14 wherein the one communication partner is a vehicle and the another communication partner is a portable electronic device.

17. A non-transitory computer readable medium comprising a plurality of instructions which are configured to, when executed, cause the performance of the method of claim 1.

18. A non-transitory computer readable medium comprising a plurality of instructions which are configured to, when executed, cause the performance of the method of claim 7.

19. The method according to claim 3, wherein the ranging procedure comprises determining a distance between the first and the second communication partner by measuring a time difference between a first time of sending a ranging signal from one of the first and the second communication partner to an other of the first and the second communication partner and a second time of receiving a response signal from the other of the first and the second communication partner.

* * * * *